United States Patent [19]

Shibahata et al.

[11] 4,440,254

[45] Apr. 3, 1984

[54] COMPLIANCE STEER CONTROL SYSTEM

[75] Inventors: Yasuji Shibahata; Namio Irie; Kazuo Ikawa; Yosuke Akatsu, all of Yokohama, Japan

[73] Assignee: Nissan Motor Co., Ltd., Yokohama, Japan

[21] Appl. No.: 319,282

[22] Filed: Nov. 9, 1981

[30] Foreign Application Priority Data

Dec. 10, 1980 [JP] Japan .................... 55-176060[U]
Dec. 11, 1980 [JP] Japan ......................... 55-173867

[51] Int. Cl.³ .......................... B62D 5/06; B62D 9/00
[52] U.S. Cl. ................................... 180/140; 180/132; 267/35; 280/671
[58] Field of Search ............... 180/712, 140, 132; 280/687, 671, 672, 711; 261/35, 152

[56] References Cited

U.S. PATENT DOCUMENTS

| 2,757,938 | 8/1956 | Crowder | 180/132 |
|---|---|---|---|
| 2,804,311 | 8/1957 | Pobanz | 280/112 A |
| 2,893,751 | 7/1959 | Hagler | 180/132 |
| 2,998,263 | 8/1961 | Muller . | |
| 3,207,254 | 9/1965 | D'Espinassy de Venel . | |
| 3,768,827 | 10/1973 | Hickman | 280/687 |
| 3,836,134 | 9/1974 | Lowe et al. | 267/35 |
| 4,137,989 | 2/1979 | Rehfeld . | |
| 4,290,452 | 9/1981 | Takahashi et al. . | |

FOREIGN PATENT DOCUMENTS

| 937810 | 1/1956 | Fed. Rep. of Germany . |
|---|---|---|
| 1630639 | 6/1971 | Fed. Rep. of Germany . |
| 55-147968 | 10/1980 | Japan . |
| 368063 | 4/1963 | Switzerland . |

Primary Examiner—Joseph F. Peters, Jr
Assistant Examiner—Donn McGiehan
Attorney, Agent, or Firm—Schwartz, Jeffery, Schwaab, Mack, Blumenthal & Koch

[57] ABSTRACT

The pressure outputs of a power steering control valve are fed either to hydraulic cylinders (or servos) or to chambered elastomeric insulator units to, in the case of the rear wheels, produce a bias which opposes a side force produced during cornering to prevent the rear wheels from undergoing "compliance steering", while in the case of front wheels, induce same to turn through an angle slightly greater than intended by the driver to either prevent compliance steering or increase same to improve vehicle handling when cornering respectively.

14 Claims, 13 Drawing Figures

COMPLIANCE STEER CONTROL SYSTEM

BACKGROUND OF THE INVENTION

1. Field of the Invention

The present invention relates generally to a vehicle steering system and more specifically to a steering system which compensates for and/or controls a compliance steering phenomenon which is apt to occur during cornering.

2. Description of the Prior Art

FIG. 1 of the drawings shows a vehicle 1, which, by way of example only, is equipped with a conventional semi-trailing arm suspension system 2. With this arrangement when the vehicle traverses a corner at high speed the elastomeric insulators 3 via which the suspension 2 is connected to the vehicle chassis 4 are distorted via a side force F as shown, causing the orientation or alignment of the rear wheels 5 to vary by an angle "E".

Despite various advances in suspension design this so called "compliance steer" phenomenon has persisted and deteriorates vehicle handling especially during high speed cornering.

SUMMARY OF THE INVENTION

The invention features an arrangement wherein a power steering is integrated with expandible hydraulic devices which vary the angle that either the front or rear wheels would otherwise assume during cornering so as to either compensate for, or accentuate the so called "compliance steering effect" induced in the rear suspension so as to improve the handling of the vehicle.

In the case that the expandible hydraulic devices are disposed with the rear suspension they are adapted to, for high speed cornering correction, bias the rear suspension mounting insulators in a manner which either neutralizes the distortion thereof by the side force (produced when the vehicle traverses a corner) or reverses same so as to maintain the rear wheels either in their normal position or bias them slightly beyond same to assume an angle the reverse of which would occur due to the "compliance steer" effect.

In the case where expandible hydraulic devices are used in conjunction with the front wheels, the arrangement is such that the angle through which the front wheels are intentionally turned by the driver is increased to, prior to the actual generation of the side force, induce a situtation wherein the compliance steering effect will be increased. This, quite unexpectedly, improves the handling of the vehicle in a manner similar to the correction (or over-correction) of the compliance steering of the rear suspension.

A further feature of the invention comes in sensing the vehicle speed and operating the compliance steering control arrangement incorporated with the rear suspension at low speed, so as to increase the "compliance steering" effect and reduce the turning circle of the vehicle.

A further feature of the invention is deemed to come in the use of especially chambered elastomeric insulator units which both simplify and lighten the system as a whole as well as prevent any rattling and undue vibration.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
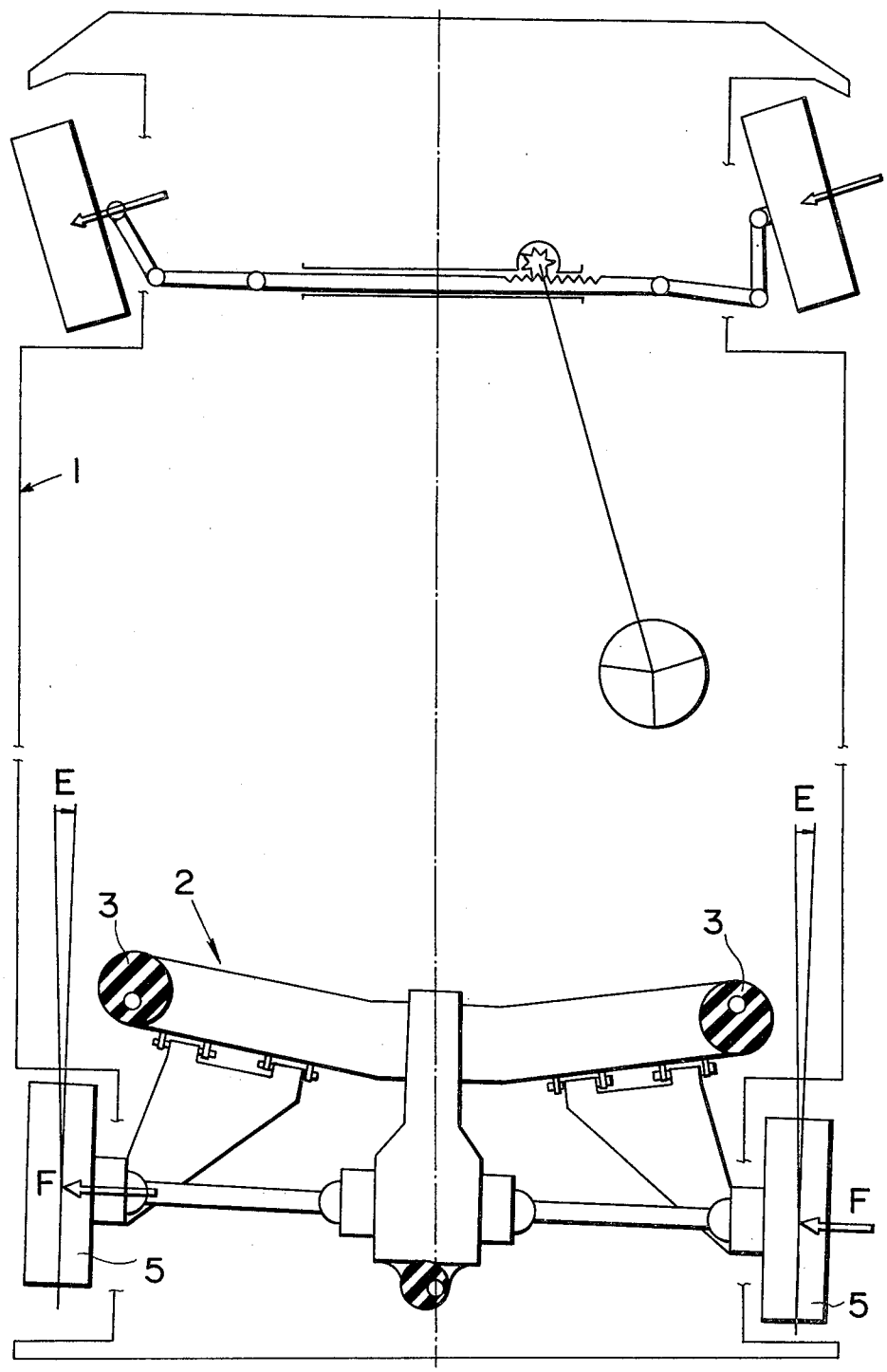
FIG. 1 is a schematic plan view of a vehicle having a prior art rear suspension subject to compliance steering.
Figure 2:
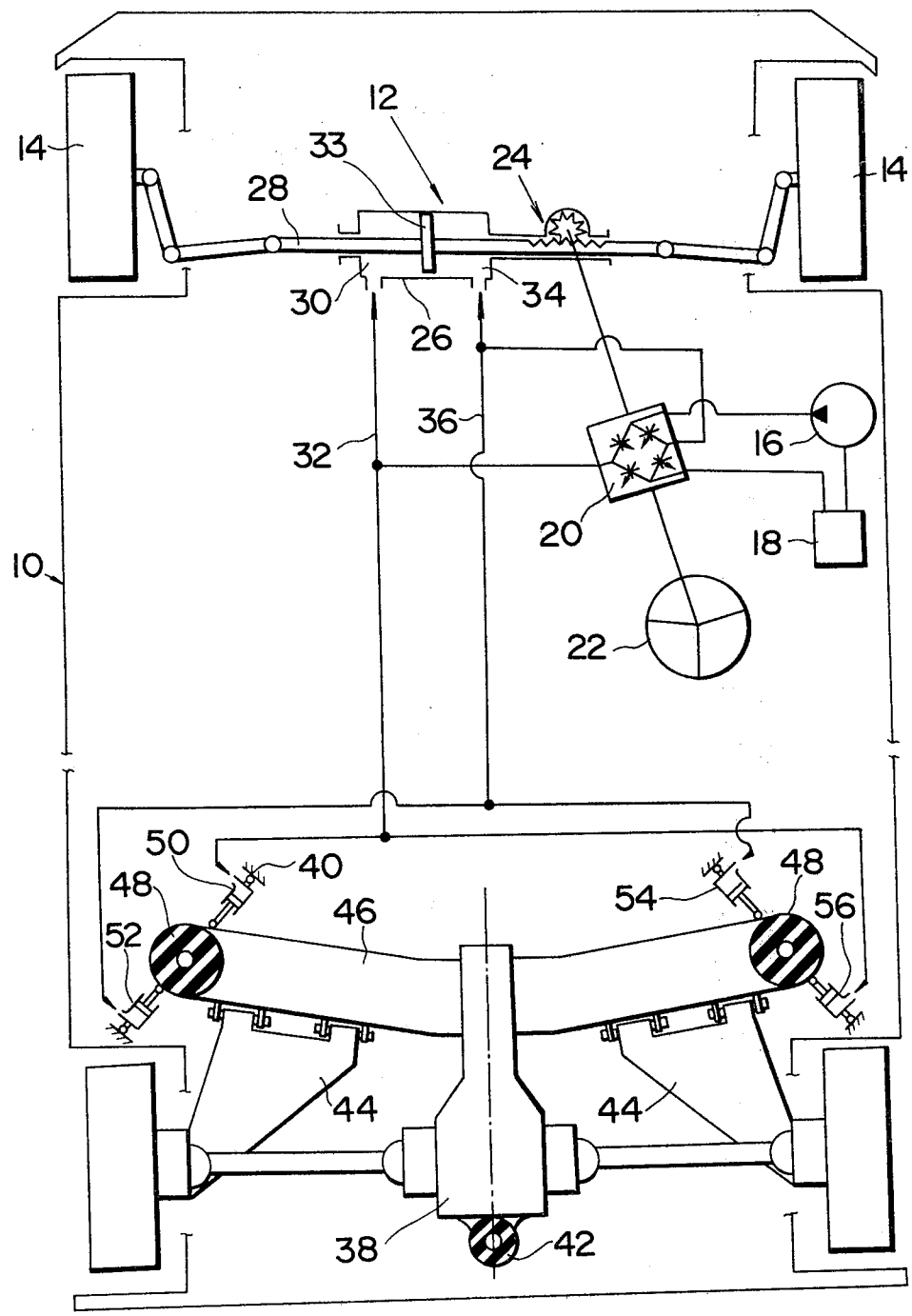
FIG. 2 is a schematic plan view of a vehicle equipped with a first embodiment of the present invention.
Figure 3:
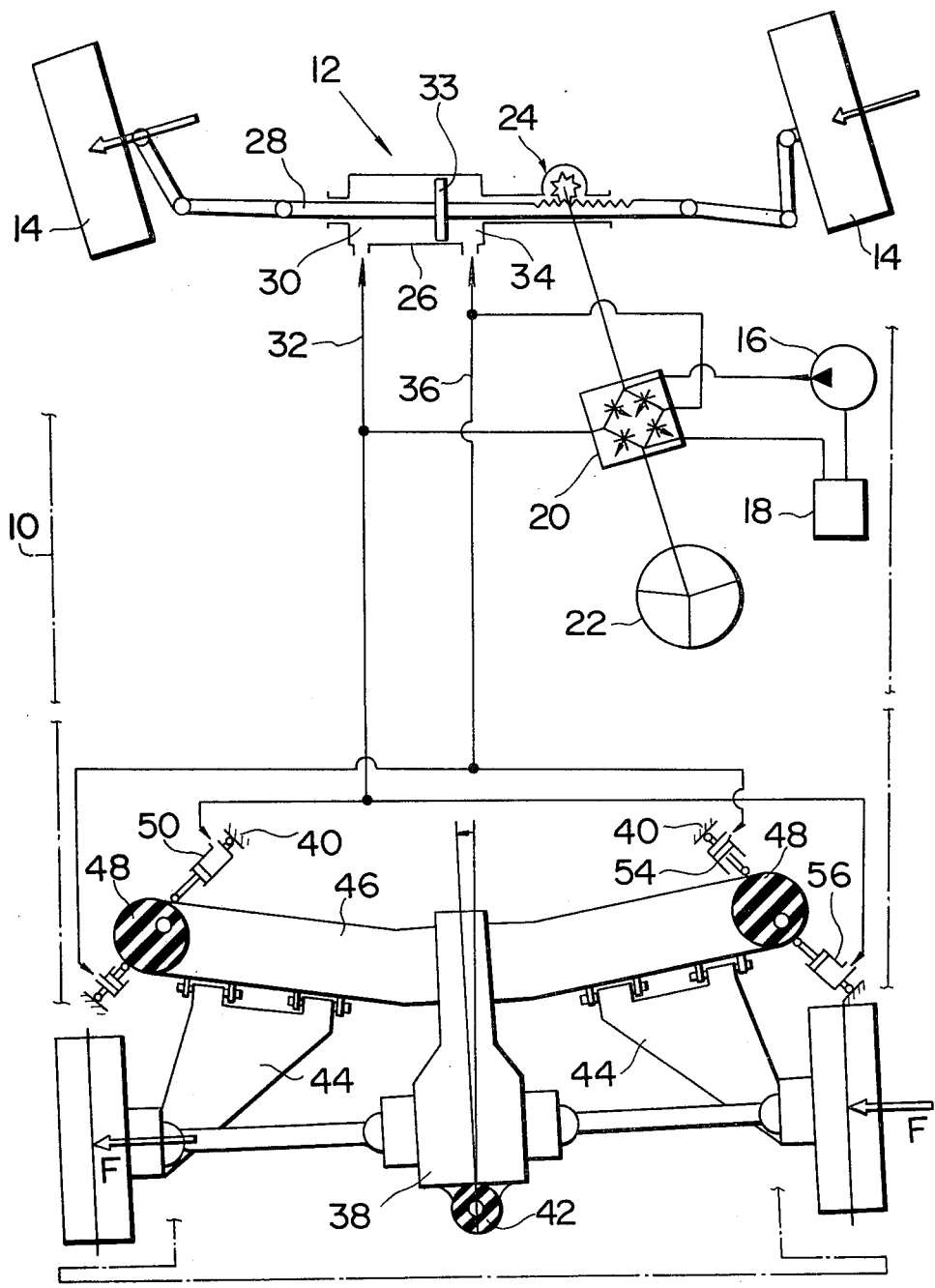
FIG. 3 is a plan view similar to that of FIG. 2 but showing the rear suspension being biased to "over-correct" for the compliance steering effect.

Turning now to the Figures and more specifically to FIGS. 2 and 3 of the drawings wherein a first embodiment of the present invention is shown, the numeral 10 indicates a vehicle equipped with a power steering 12 which is associated with the front wheels 14. This power steering includes a pump 16 and reservoir 18. A control valve 20 of the power steering is fluidly communicated with the pump 16 and responsive to the rotation of a steering wheel 22 which is, as shown, mechanically connected to a rack and pinion steering gear 24. A hydraulic servo 26 is operatively connected to a tie rod 28 and fluidly connected to the control valve 20 in a manner that when the steering wheel 22 is rotated anti-clockwise, a chamber 30 of the servo 26 is pressurized with hydraulic fluid from the pump 16 through a conduit 32. This drives a piston 33 of the power steering servo 26 to the right as seen in the drawings to assist the steering of the front wheels. Conversely, when the steering wheel is rotated in the clockwise direction a chamber 34 of the servo 26 is pressurized via conduit 36 and the piston 33 is driven to stroke to the left (as seen in the drawings) to assist the turning of the wheels to the right.

The above kind of arrangement is of course well known, examples of such being found in U.S. Pat. No. 4,290,452 issued on Sept. 22, 1981 in the name of Takahashi et al. and U.S. Pat. No. 4,137,989 issued on Feb. 6, 1979 in the name of Rehfeld.

The vehicle 10 is in this case, merely by way of example, a front engine - rear wheel drive type wherein the final drive or differential gear 38 is mounted to the vehicle chassis 40 through an elastomeric insulator 42. In this vehicle the rear suspension is, by way of example, a semi-trailing arm type wherein pivotal trailing arms 44 are pivotally mounted on a sub-frame 46. This sub-frame is in turn mounted to the vehicle through elastomeric insulators 48.

Connected between the vehicle chassis 40 and the elastomeric insulators are extendible shock absorber-like cylinder 50–56. These hydraulic cylinders are connected to the control valve 20 so that upon the steering wheel 22 being rotatated in the anti-clockwise direction the cylinders 50 and 56 are pressurized through conduit 32 while cylinders 52 and 54 are drained via conduit 36 to bias the sub-frame 46 to rotate in a manner as shown in FIG. 3 (viz., rotate anti-clockwise as seen in the figure). Conversely, when the steering wheel is rotated in the clockwise direction the hydraulic cylinders 52 and 54 are pressurized while cylinders 50 and 56 are drained to cause the sub-frame to rotate in the reverse direction (viz., clockwise).

With this arrangement, when the front wheels 14 are turned so as to induce the vehicle to turn to the left (for example) and traverse an arcuate path, the side force F which is accordingly produced is balanced by the bias applied to the sub-frame 46 of the rear suspension by the hydraulic cylinders, with the result that the rear wheels do not undergo the compliance steering phenomenon.

As the pressure outputted from the control valve 20 varies with such parameters as the degree by which the steering wheel is turned, the pressure fed to the hydraulic cylinders is varied in accordance with the sharpness of the turn of the vehicle and tends to vary with the magnitude of side force subsequently produced. That is to say, if the vehicle is driven through a sharp corner at high speed, a relatively high side force is apt to be produced, however, as the output of the control valve is relatively high under such conditions the compliance steer phenomenon is compensated for without the need of additional pressure control valves or the like.

It is also possible to "over-correct" the compliance steering effect by selecting, by way of example, the diameter of the hydraulic cylinders 50–56 and accordingly the surface area on which the pressure from the control valve 20 acts. Thus, if so desired it can be arranged that the rear suspension be biased beyond its normal position against the side force F to actually assume an orientation such as shown in FIG. 3 during cornering.

Figure 4:
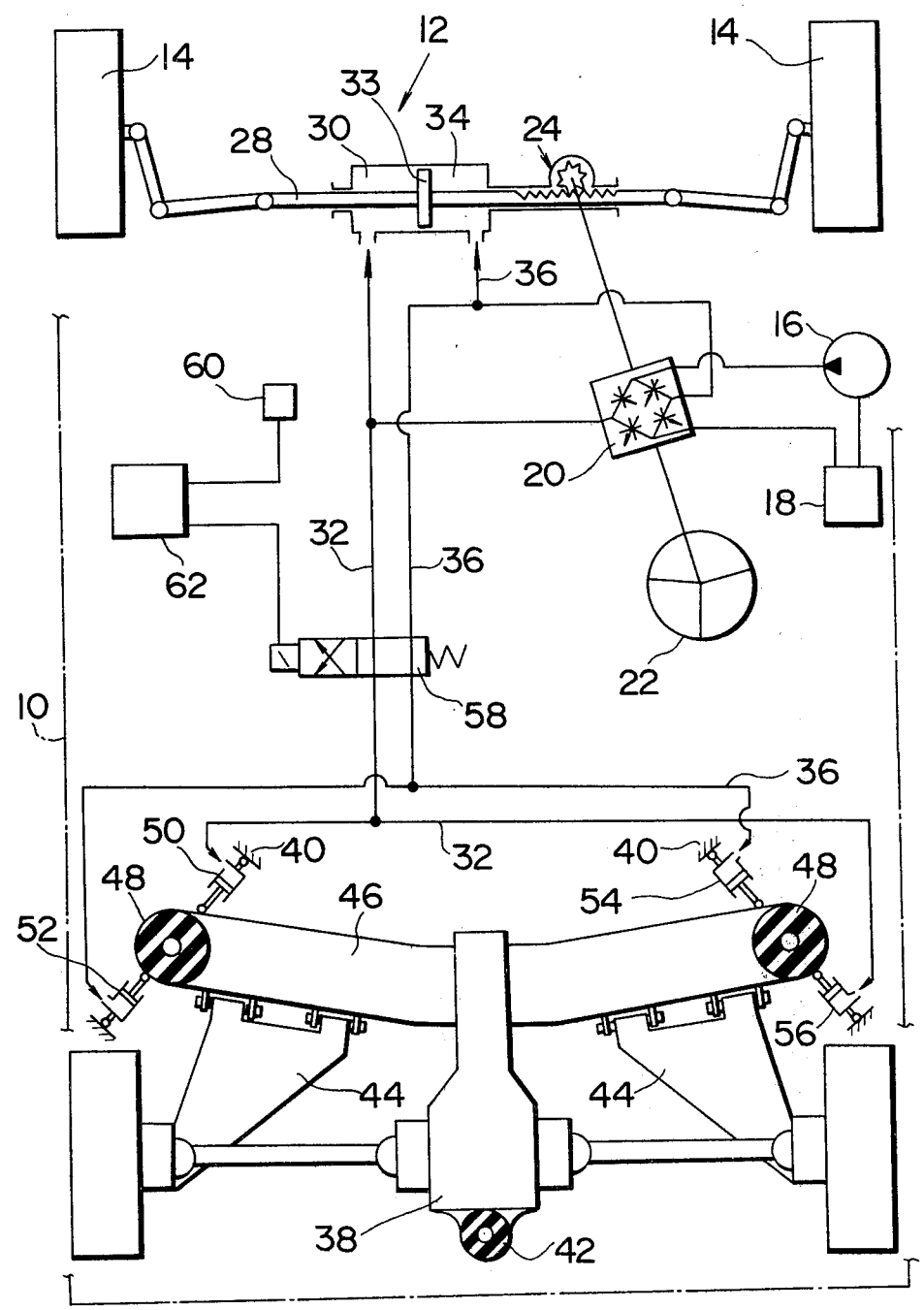
FIG. 4 is a plan view similar to that of FIGS. 2 and 3 showing a third embodiment of the present invention wherein a solenoid controlled reversal valve is incorporated into the system to induce increased compliance steering at low speeds and reduce the turning circle of the vehicle.

FIG. 4 showns a second embodiment of the present invention. This embodiment is essentially the same as the previous one except for the additional provision of a solenoid controlled valve 58 which is interposed in the hydraulic conduits 32, 36 interconnecting the control valve 20 and the hydraulic cylinders. This valve is operatively connect to a speed sensor 60 (such as the vehicle speedometer or the like) via a suitable comparison and amplifying circuit 62, so that at low speeds the connection between conduits 32 and 36 may be reversed to reverse the action of the hydraulic cylinders 50–56. That is to say, at low speed the hydraulic cylinders may be employed to actually induce or amplify the compliance steer effect in the rear suspension to reduce the turning circle of the vehicle, while at speeds above a predetermined level the connection is rendered the same as in the case of the first embodiment to produce exactly the same effect.

Figure 5:
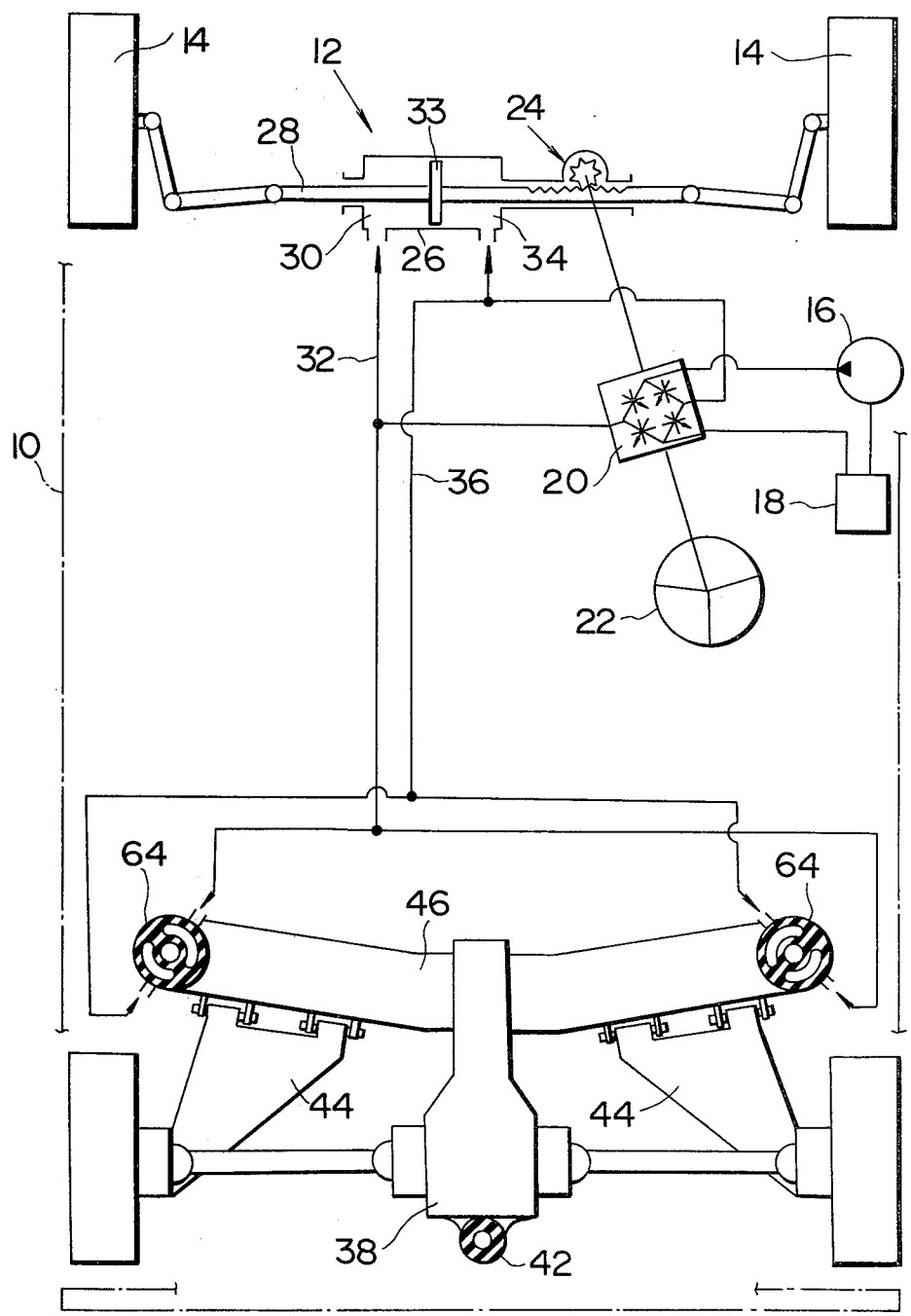
FIG. 5 shows a third embodiment of the present invention wherein the elastomeric bodies or bushes of the mounting insulators of the rear suspension are chambered to form a vital part of the system according to the invention.
Figure 6:
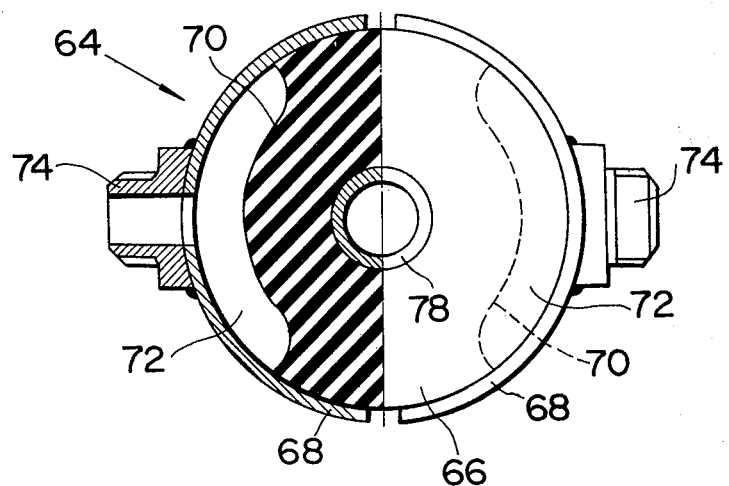
FIGS. 6 and 7 are respectively partly sectioned plan and elevations of a chambered elastomeric insulator unit such as used in FIG. 5.
Figure 7:
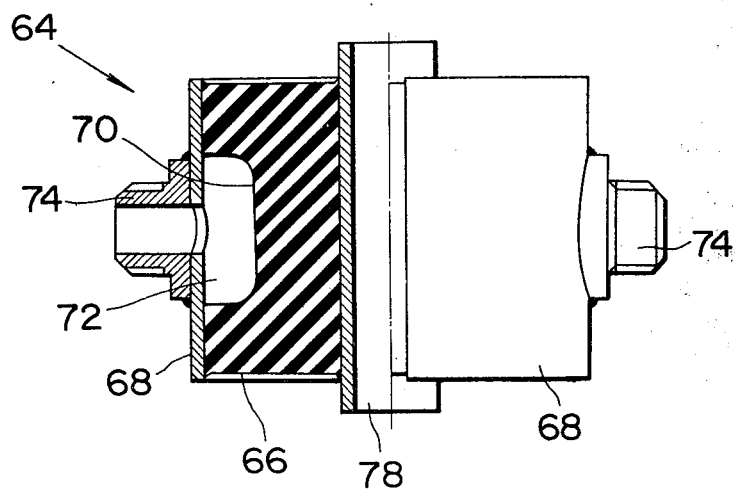

FIG. 5 of the drawings shows a third embodiment of the present invention. In this case the hydraulic cylinders of the first and second embodiments are replaced with chambered elastomeric insulator units 64 such as shown in FIGS. 6 to 11. In FIGS. 6 and 7 one example of a chambered elastomeric mounting unit 64 is shown. In this arrangement, an elastomeric insulator body or bush 66 is encased in two semi-cylindrical casing members 68 which are vulcanized or otherwise fixedly secured to the outer periphery thereof. Recesses 70 formed in the insulator are closed off by the casing members to define closed variable volume chambers 72. The casing members are suitably apertured and have connection nipples 74 or the like welded or otherwise connected to the outer periphery of the casing members 68.

The above described unit is disposed within a suitable collar 76 fixed to the suspension sub-frame 46.

With this arrangement, the need for two seperate hydraulic cylinders per insulator is eliminated by orienting the chambers as shown in FIG. 5. That is to say, in a manner which enables the application of the maximum torque to the sub-frame 46 upon pressurization of one of the two variable volume chambers 72.

Figure 8:
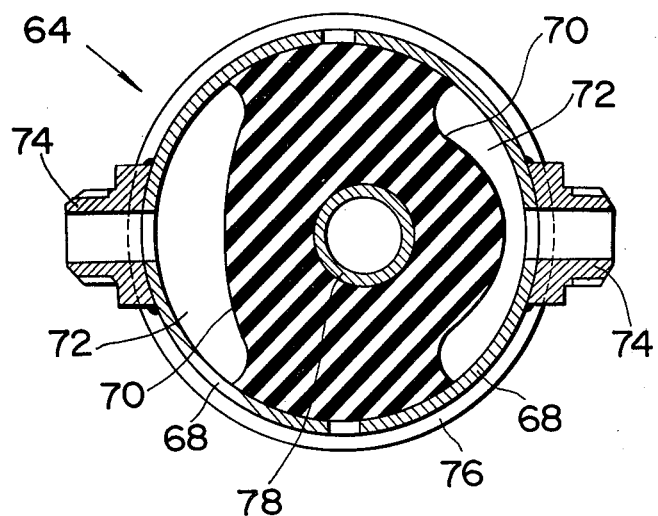
FIGS. 8 and 9 are fully sectioned plan and elevations of the chambered elastomeric insulator unit shown in FIGS. 6 and 7 showing one of the chambers thereof pressurized.
Figure 9:
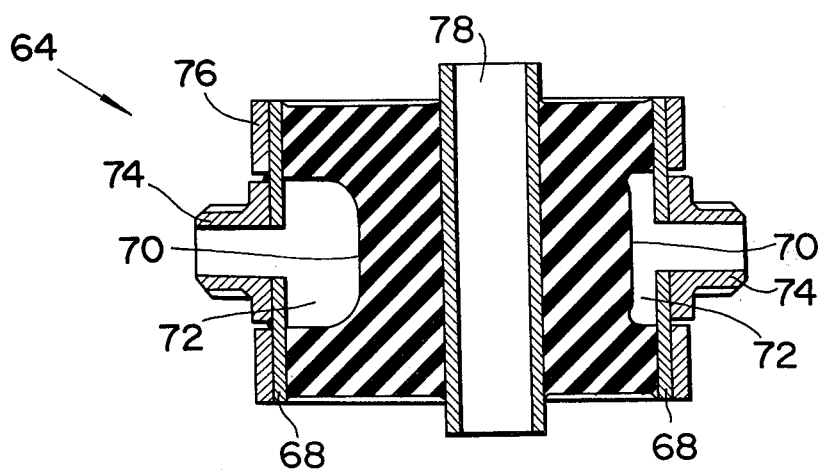

FIGS. 8 and 9, show the above described chambered insulator unit disposed in a collar 76 and with one of the chambers pressurized. As shown, the sleeve 78 through which a bolt or the like is disposed to fasten the suspension sub-frame 46 to the vehicle chassis 40, is displaced from its normal or home position. The non-pressurized chamber is, as shown reduced in capacity under this condition, the fluid contained therein being in part pumped back through the conduiting to the control valve 20 and reservoir 18. The dimensions of the recesses 70 formed in the elastomeric bushes of course should be selected in a manner that the upon the pressurization the force which biases the sleeve 78 from its home position is at least equal to or greater than the side force produced. This selection of course requires the output pressure of the control valve 20 to be known along with the elastic modulus of the insulator bush, the surface area of the recesses which will produce a laterally acting force etc; all of which are apt to vary from vehicle to vehicle.

Figure 10:
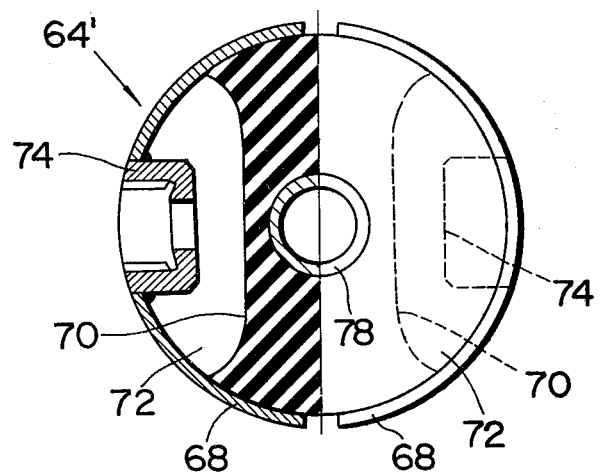
FIGS. 10 and 11 shown a variation of the chambered elastomeric insulator unit shown in FIGS. 8 and 9.
Figure 11:
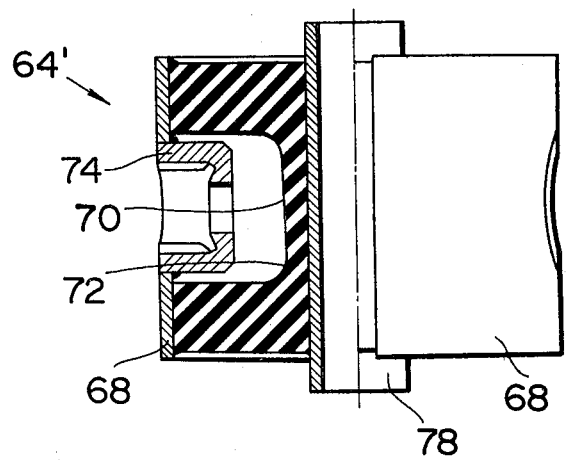

FIGS. 10 and 11 show a second example of the chambered elastomeric insulator unit 64'. In this case, the connection nipples 74 are disposed through apertures formed in the semi-cylindrical casing members 68 so as project into the variable volume chambers 72 per se. This arrangement of course has the benefit in that as the nipples 74 do not project from the casing members the resulting flush outer peripheral surface allows for the chambered insulator units 64' to be placed in a collar of the type normally used to secure a normal non-chambered elastomeric insulator. The conduits 32, 36 may be connected to the nipples 74 through apertures which may be readily drilled or otherwise formed in the existing sub-frame collars 76. This of course allows for existing suspension units to have the invention applied thereto without major redesign and machining.

The use of the chambered elastomeric insulator units also has the advantages that, vibration is not transmitted to the chassis 40 as is possible in the case that metallic extensible struts or cylinders are used, the arrangement as a whole is highly compact and special mounting sites on the vehicle chassis for the cylinders are not required.

Figure 12:
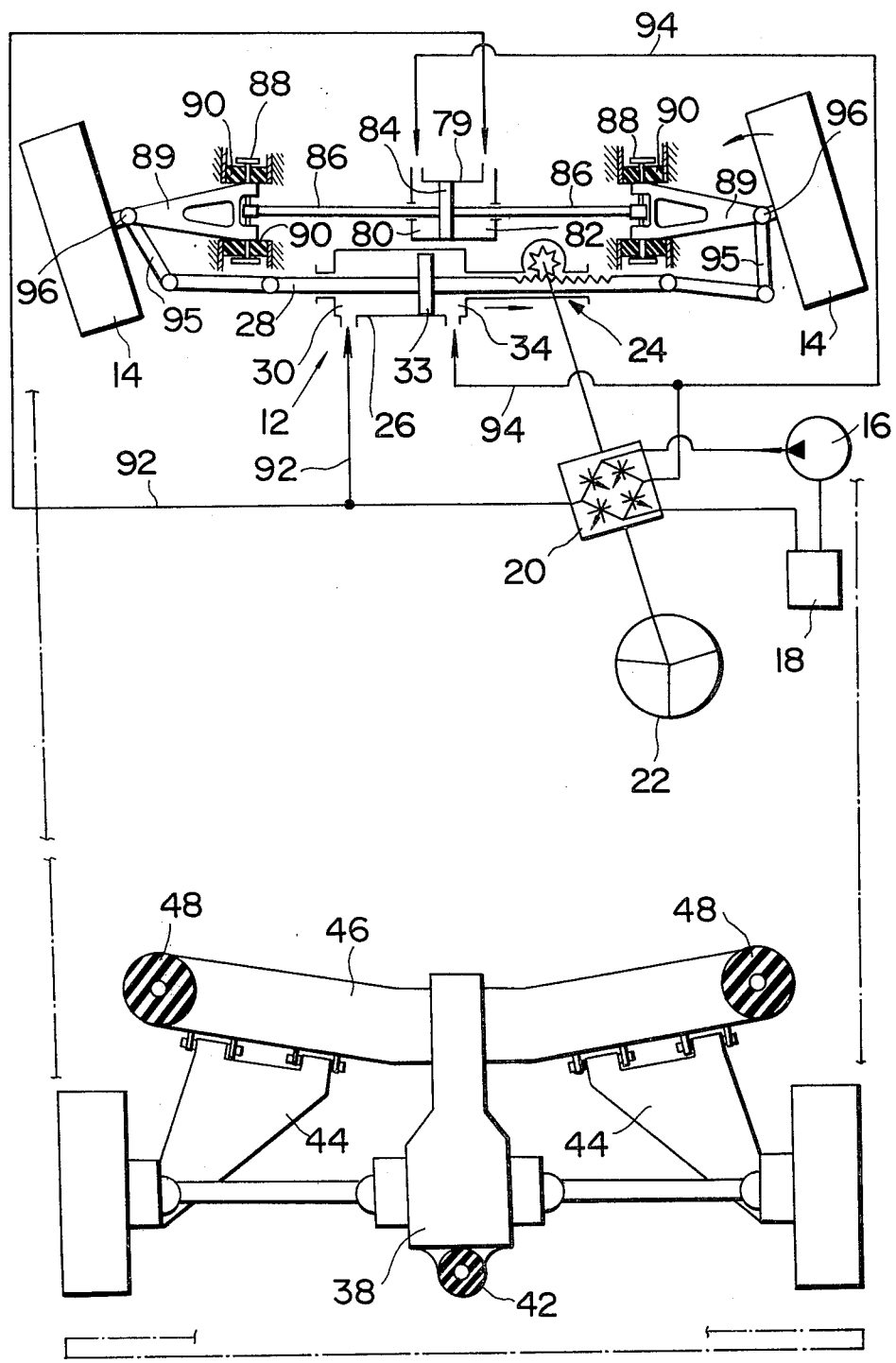
FIG. 12 is a schematic plan view of a fourth embodiment of the present invention wherein the invention is applied to the front wheels of the vehicle.

FIG. 12 shows a fourth embodiment of the present invention. In this embodiment the invention is applied to the front wheels of the vehicle as different from rear wheels as in the previous embodiments.

In this embodiment, a hydraulic servo 79 disposed between the front wheels 14 includes a piston 84 which divides the servo interior into first and second variable volume chambers 80, 82. Pins 88 which pivotally connect traverse links 89 of a strut and traverse link type front suspension to the vehicle are interconnected with the piston 84 via connecting rods 86. Each of these pins 88 are mounted to the chassis 40 of the vehicle through elastomeric insulators or bushes 90 which function to damp vibration and shock from the front wheels 14. The servo 79, in this case, is connected to the control valve 20 through conduits 92, 94 which respectively communicate with chambers 82, 80. With this arrangement when the steering wheel 22 is rotated in the anti-clockwise direction for example, chamber 82 of the servo 78 and the chamber 30 of the power steering servo 26 are pressurized through conduit 92 while chambers 80 and 34 are drained via conduit 94. Thus, the piston 33 and the tie rod 28 are moved axially to the right (as seen in the drawing) to cause the front wheels 14 to turn to the left via the mechanical connection provided therebetween by the knucle rods 95. Simultaneously, the piston 84 is driven to the left (as seen in the drawing) to move the pin 88 which pivotally mounts the front left-hand wheel traverse link 89 in the outboard direction via the connection provided by the connection rods 86 and pull the pin 88 associated with the front right-hand wheel traverse link inboard. The result is that the ball joint or king pin 96 of the front left-hand wheel is moved outwardly by a small amount while the corresponding ball joint 96 of the front right-hand wheel is moved inboard by the same distance. The tie rod 28 accordingly tend to pull and push the respective knucle rods 96 of the front left and right hand wheels to induce the front wheels to turn through an additional angle to the left and increase the angle through which the front wheels are turned by a degree slightly greater than that intentionally induced by the driver.

In the case that the a "double wish bone" type suspension is employed with the front wheels as different from the above described "transverse link-strut" type, then it would be necessary to connect the piston 84 to the pins on which both of the upper and lower control arms are pivoted, to the piston 84. This could be simply acheived by using two sets of connection rods or even using chambered insulator units such as shown in FIGS. 10 and 11 for example in place of the insulators or bushes 90 (in the case of a "strut-transverse link" type suspension) and/or their equivalents in the case of a "double wish bone" suspension.

Figure 13:
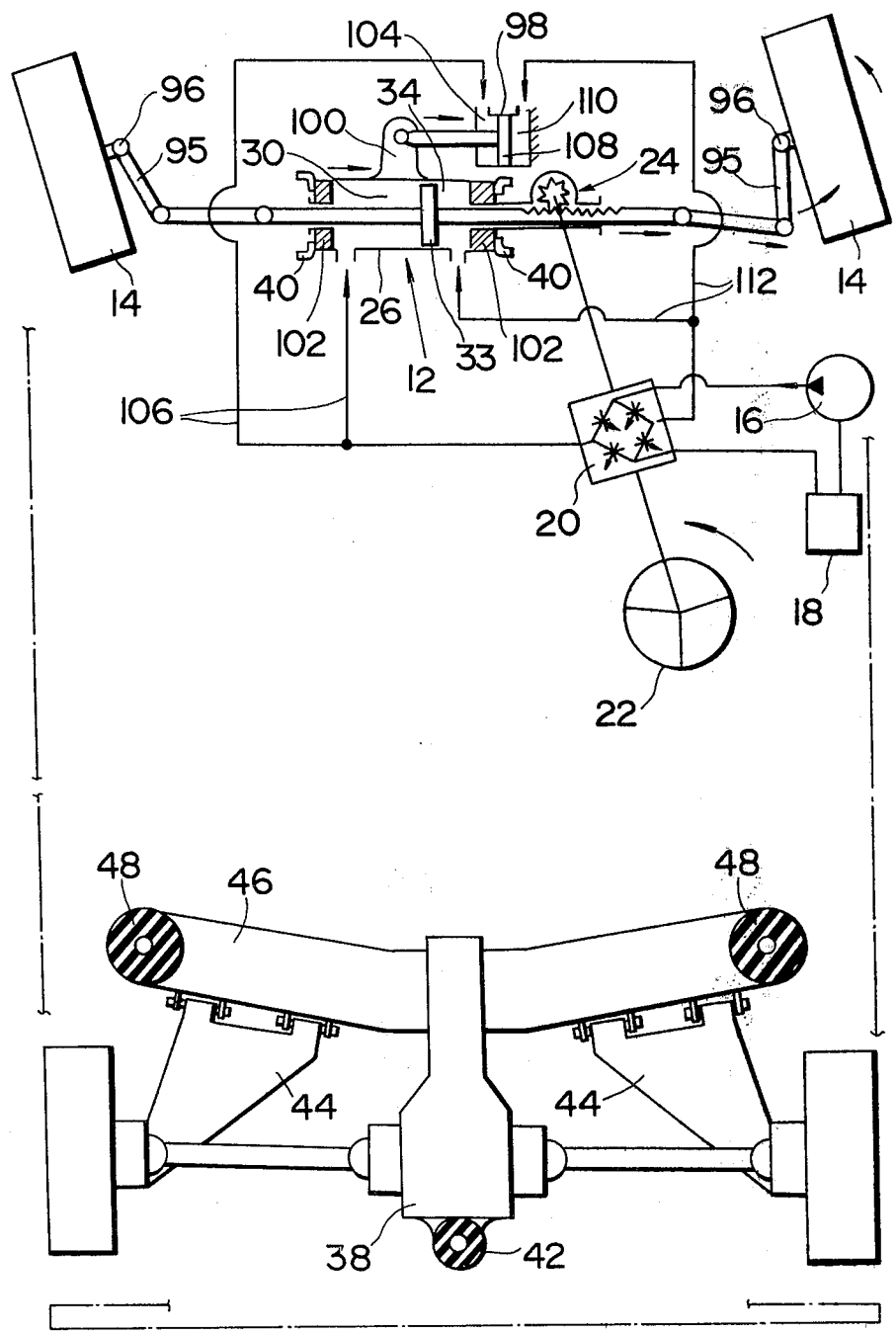
FIG. 13 is a schematic plan view of a vehicle equipped with a fifth embodiment of the present invention which is also applied to the front wheels of the vehicle.

FIG. 13 shows a fifth embodiment of the present invention. This embodiment like the last is applied to the front wheels 14 of the vehicle. However, unlike the previous embodiments the system of the invention does not act through the suspension of the vehicle but through the power steering 26 per se. In this arrangement a servo 98 is connected to a movable housing 100 which houses the servo 26 and rack and pinion gear 24 therein and which is in turn connected to the chassis 40 of the vehicle through elastomeric bushes or insulators 102. With this arrangement when the steering wheel 22 is rotated in the anti-clockwise direction for example, a chamber 104 of the servo 98 is pressurized through conduit 106 to bias the piston 108 of the servo to the right (as seen in the drawings) while the piston 33 of the power steering servo 26 is also biased in the same direction via the pressurization of chamber 30 thereof. Conversely, when the steering wheel 22 is rotated in the clockwise direction a chamber 110 of the servo 98 is pressurized via conduit 112. Simultaneously chamber 34 of the power steering servo 26 is pressurized moving the piston 33 to the left (as seen in the drawings). With this arrangement for any given amount of intentional steering, the front wheels 14 are turned through an additional amount because of the movement of the housing 100. The degree of movement of the housing is of course controllable by selecting the size and elastomeric modulus of the bushes 102 which mount the the housing 100 to the chassis 40 and which are distored upon movement of the housing 100 under the influence of the servo 98. Other factors influencing the movement are, the diameter of the piston and the output pressure of the control valve 20. Alternately, the bushes 102, may be chambered and suitably connected to the control valve 20 if so desired in place of the piston type servo.

What is claimed is:

1. In a vehicle having a pair of steerable front wheels mounted to said vehicle through a front suspension arrangement, a power steering system associated with said pair of front wheels through a linkage arrangement, which power steering includes a source of hydraulic pressure, a hydraulic servo having first and second chambers, a control valve responsive to the rotation of a steering wheel of the vehicle for selectively pressurizing said first and second chambers, and a pair of rear wheels mounted to said vehicle by a rear suspension arrangement which includes elastomeric mounting members;

a compliance steer control system responsive to the pressurization of said first and second chambers for producing a bias which tends to turn one of said pair of front wheels and said pair of rear wheels with respect to said vehicle in the same direction as said front pair of wheels are turned in response to the rotation of said steering wheel.

2. A system as claimed in claim 1, which includes:
chambered means fluidly communicated with said control valve for producing said bias which acts on one of said pair of front wheels and said pair of rear wheels, said bias varying with the pressure fed thereto from said control valve in a manner to at least compensate for the compliance steering of the pair of rear wheels when said vehicle is steered to traverse a curved path.

3. A system as claimed in claim 2, wherein said chambered means comprises first and second pairs of extensible hydraulic cylinders which are connected to said rear suspension in a manner to produce said bias which at least neutralizes the effect of a side force produced by the turning of the vehicle in response to the steering of said pair of front wheels via rotation of said steering wheel on said pair of rear wheels.

4. A system as claimed in claim 1, further comprising:
means responsive to vehicle speed being below a predetermined value for reversing the bias applied to said pair of rear wheels to amplify the compliance steering of said pair of rear wheels and reduce the turning circle of the vehicle.

5. A system as claimed in claim 2, wherein said chambered means comprises an elastomeric insulator having first and second discrete chambers defined therein, said elastomeric insulator being operatively connected to at least one of said pair of front wheels and said pair of rear wheels.

6. A system as claimed in claim 5, wherein said elastomeric insulator is used to connect at least one of said front suspension, said rear suspension and said power steering to said vehicle.

7. A compliance steer control system for an automotive vehicle having a longitudinal axis, a pair of steerable front wheels mounted to said vehicle by a front suspension and a pair of rear wheels mounted to said vehicle by a rear suspension comprising:
- a power steering system associated with said pair of front wheels which includes a source of hydraulic pressure, a hydraulic servo having first and second chambers and a control valve responsive to the rotation of a steering wheel of the vehicle for selectively pressurizing said first and second chambers in response to the rotation of said steering wheel; and
- a system responsive to the pressurization of said first and second chambers for producing a bias which tends to vary the orientation of at least one of said pair of front wheels and said pair of rear wheels with respect to the longitudinal axis of said vehicle in a manner to tend to turn same in the same direction as said pair of front wheels are turned in response to the rotation of said steering wheel.

8. In a vehicle having a pair of steerable front wheels mounted to said vehicle through a front suspension arrangement, a power steering system associated with said pair of front wheels through a linkage arrangement, which power steering includes a source of hydraulic pressure, a hydraulic servo having first and second chambers, a control valve responsive to the rotation of a steering wheel of the vehicle for selectively pressurizing said first and second chambers, and a pair of rear wheels mounted to said vehicle by a rear suspension arrangement which includes elastomeric mounting members; and
- a compliance steer control system responsive to the pressurization of said first and second chambers for producing a bias which tends to turn said pair of front wheels with respect to said vehicle in the same direction as said front pair of wheels are turned in response to the rotation of said steering wheel,
- said compliance steer control system including hydraulic servo chambered means fluidly communicated with said control valve for producing said bias, said chambered means operatively connected to said pair of front wheels in a manner to increase the angle through which they are turned by said power steering, said bias varying with the pressure fed thereto from said control valve so as to at least compensate for the compliance steering of the pair of rear wheels when said vehicle is steered to traverse a curved path.

9. A system as claimed in claim 8, wherein said servo is operatively connected to said front suspension.

10. A system as claimed in claim 8, wherein said servo is connected to a movable housing which forms part of said power steering, said housing being mounted to said vehicle through elastomeric means and adapted to be axially movable in the lateral direction of the vehicle via the distortion of said elastomeric means.

11. In a vehicle
- a chassis having a longitudinal axis;
- a pair of front wheels operatively connected to said chassis by a front suspension;
- a pair of rear wheels operatively connected to said chassis by a rear suspension;
- a steering wheel operatively connected with said pair of front wheels by a steering mechanism for turning said pair of front wheels with respect to said longitudinal axis to steer said vehicle;
- a power steering system including a source of fluid under pressure, a valve responsive to the rotation of said steering wheel and a hydraulic servo which assists the turning of said pair of front wheels in response to the output of said valve; and
- means responsive to the output of said valve for one of (a) turning said pair of front wheels by an amount additional to that normally produced by the rotation of said steering wheel and (b) tending to turn said pair of rear wheels in the same direction with respect to said longitudinal axis as said pair of front wheels are turned by rotation of said steering wheel.

12. A vehicle as claimed in claim 11, further comprising:
- means responsive to vehicle speed being below a predetermined level for causing said valve output responsive means to turn said pair of rear wheels in a direction opposite to the direction in which said pair of front wheels are turned to amplify the compliance steering of said rear wheels and reduce the turning circle of the vehicle.

13. A vehicle as claimed in claim 11, wherein said rear suspension includes a sub frame mounted to said chasis through first and second elastomeric insulators, and wherein said valve output responsive means takes the form of
- first and second pairs of extensible hydraulic cylinders which are each connected at one end to said chassis and at the other end to said sub frame.

14. A vehicle as claimed in claim 11, wherein said rear suspension includes a sub frame mounted to said chassis through first and second elastomeric insulators and wherein said valve output responsive means comprises means defining first and second chambers within each of said first and second elastomeric insulators.

* * * * *